Feb. 28, 1933.         S. A. JEFFRIES         1,899,332
GEAR SHIFTING MECHANISM
Filed July 1, 1929         2 Sheets-Sheet 1
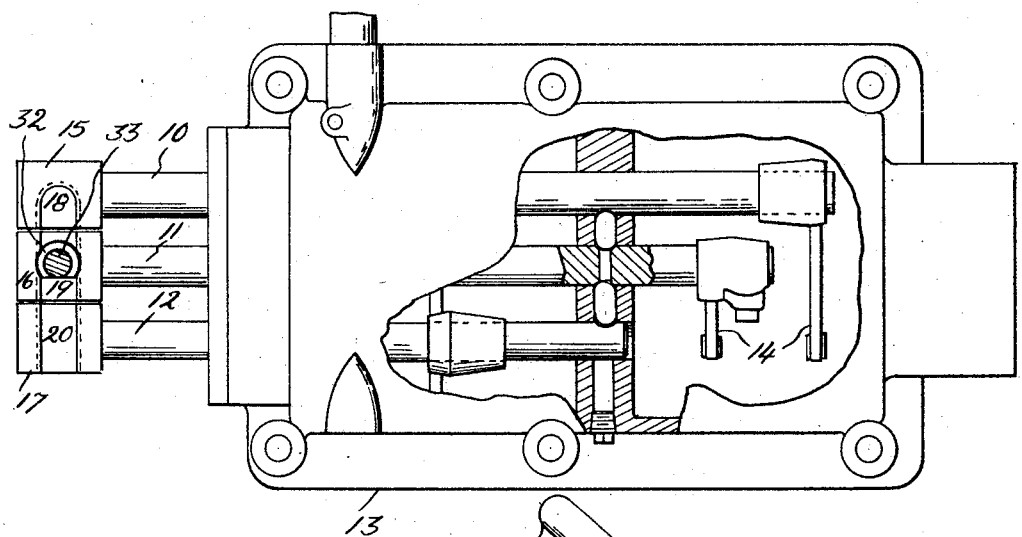
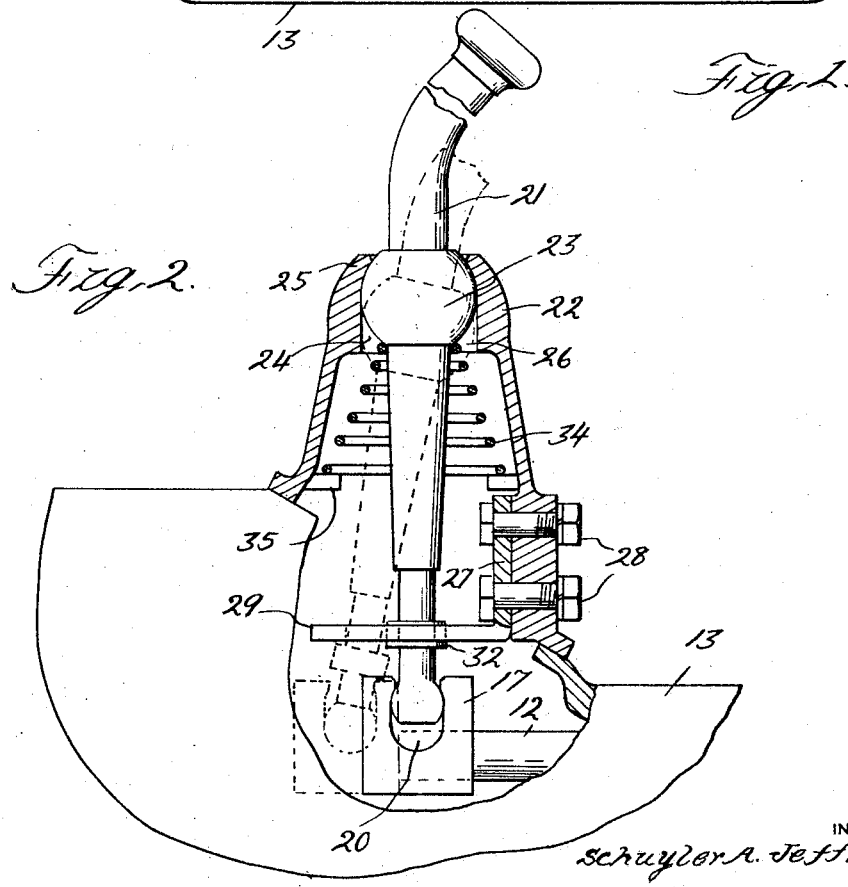
INVENTOR
Schuyler A. Jeffries
BY
Whittemore Hulbert Whittemore Belknap
ATTORNEYS Feb. 28, 1933. S. A. JEFFRIES 1,899,332
GEAR SHIFTING MECHANISM
Filed July 1, 1929   2 Sheets-Sheet 2
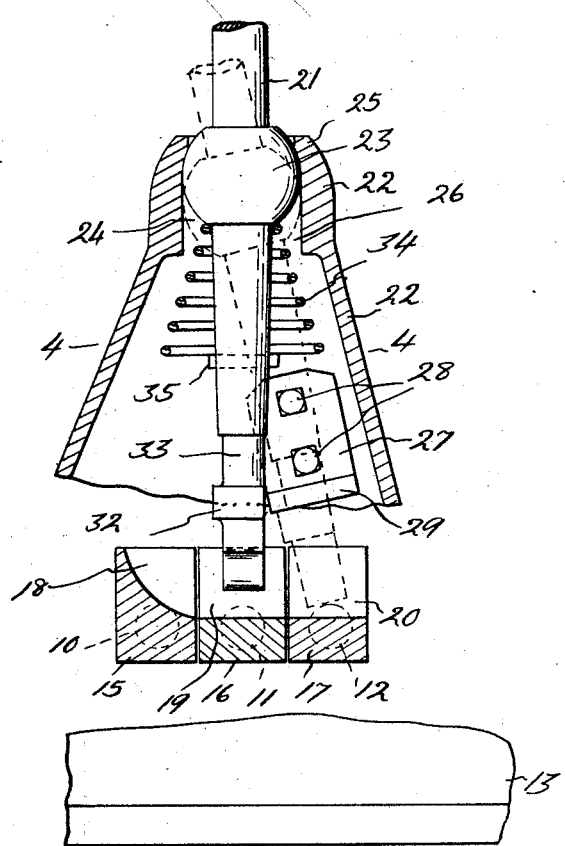
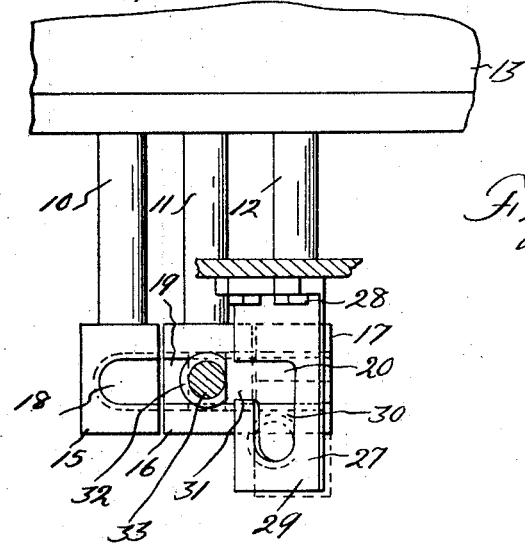
INVENTOR
Schuyler A. Jeffries
BY
ATTORNEYS Patented Feb. 28, 1933

1,899,332

UNITED STATES PATENT OFFICE

SCHUYLER A. JEFFRIES, OF LANSING, MICHIGAN, ASSIGNOR TO REO MOTOR CAR COMPANY, OF LANSING, MICHIGAN, A CORPORATION OF MICHIGAN

GEAR SHIFTING MECHANISM

Application filed July 1, 1929. Serial No. 375,236.

This invention relates generally to transmissions of the sliding gear type and has particular reference to automobile transmissions wherein a control lever is provided for selectively actuating the gears to obtain different speed combinations.

One of the primary objects of this invention is to provide means associated with at least one of the change speed actuators for preventing accidental movement of the control lever into operative engagement therewith.

Another object of this invention is to provide means of the above type operable upon a predetermined movement of the gear shift control lever to permit the latter to move into engagement with the desired change speed gear actuator for operating the same.

A further object of this invention is to provide means of the foregoing character distinguished by its simplicity of construction and operation, which not only enhances its value commercially, but permits the same to be economically manufactured, assembled, and installed.

With the foregoing, as well as other objects in view, the invention resides in the particular construction and arrangement of parts to be more fully hereafter set forth.

In the drawings:

Figure 1 is a top plan view partly in section of a transmission constructed in accordance with this invention.

Figure 2 is a fragmentary side elevational view of the transmission with certain parts broken away to illustrate the gear shifting mechanism.

Figure 3 is a fragmentary sectional view showing the control lever in two positions of adjustment.

Figure 4 is a sectional view taken substantially on the plane indicated by the line 4—4 of Figure 3.

For the purpose of illustration, I have shown my invention as applied to a 4-speed slidable gear transmission comprising three gear shifting rails, 10, 11 and 12. These rails are slidably mounted within suitable bearings formed in the transmission housing 13 and are provided with gear shifting forks 14 adjacent the forward ends thereof, adapted for engagement with the slidable gears (not shown) in the transmission. The rear ends of the rails are preferably provided with enlarged portions 15, 16 and 17, having recesses 18, 19 and 20 respectively therein of sufficient width to receive the lower end of the gear shift control lever 21. The latter extends above the floor boards of the vehicle in the conventional manner and is mounted in the housing 22 for movement in three directions transversely to each other. In detail, the lever 21 is provided intermediate the ends thereof with a ball shaped portion 23 adapted to engage in a suitable opening 24 formed in the upper end of the housing 22. The opening 24 terminates at the upper end thereof in an inwardly flared portion 25 adapted to engage the ball shaped portion 23 in the normal position of the lever to restrict upward movement thereof. The lower portion of the opening 24 is formed substantially straight as indicated at 26 so as to permit the control lever 21 to be moved downwardly. Thus it will be apparent that the control lever, in addition to being capable of a rocking movement, is also capable of a longitudinal movement.

As shown particularly in Figure 3 of the drawings, the end of the gear shift lever 21 is normally prevented from entering the recess 20 in the enlarged portion 17 of the slidable rail 12 by means of a guard member 27. The latter is preferably secured to the housing 22 by means of the bolts 28 and is provided with a laterally projecting flange 29 having a longitudinally extending slot 30 therein terminating at the forward end in a restricted opening 31. As shown in the aforesaid figure, the flange 29 is spaced above and slightly inwardly beyond the entrance to the recess 20, in such a manner that the restricted opening 31 assumes a position in alignment with an enlarged portion 32 formed upon the lever 21 adjacent the lower end thereof. The maximum diameter of the enlarged portion 32 is substantially greater than the width of the opening 31 so that the latter will be restrained from entering the opening 31 with the result that the lower end of the lever 21 will be prevented from engaging the rail 12 when the lever 21 is in its normal position as shown by the full lines in Figure 3. Thus it will be seen that under ordinary driving conditions, the operator will be permitted to engage the lever 21 with either of the rails 10 and 11 to actuate the change speed gears connected thereto, but will be prevented from engaging the lever 21 with the shifter rail 12.

In order to permit actuation of the shifter rail 12, the lever 21 is provided with a reduced portion 33 above the enlarged portion 32. This reduced portion is of slightly less diameter than the width of the opening 31 so as to permit the same to pass through the opening 31 into the slot 30, and thereby permit the lever 21 to engage in the recess 20 for actuating the shifter rail 12. The arrangement is such that when it is desired to actuate the shifter rail 12, the operator merely exerts a downward force upon the lever 21 so as to move the enlarged portion 32 to a position below the flange 29. When the parts are in this position the reduced portion of the lever assumes a position in alignment with the opening 31, and inasmuch as the reduced portion 33 is of less diameter than the width of the opening, the lever may be rocked to the position shown by the dotted lines in Figure 3 to actuate the shifter rail 12. Longitudinal movement of the lever 21 from the position shown by the full lines in Figure 3 is yieldably resisted by means of a spring 34 surrounding the lever 21 below the ball 23, and having one end engageable with the under side of the ball and the opposite end seated upon suitable lugs 35 projecting laterally and inwardly from the housing 22.

Thus from the foregoing, it will be apparent that I have provided means adapted for use in connection with a transmission for preventing accidental movement of the gear shifting control lever into engagement with one of the change speed gear actuating rails. It will further be noted that I have provided means of this type operable upon a predetermined movement of the control lever to permit the latter to engage the shifter rail and operate the same.

What I claim as my invention is:

1. A transmission having in combination, a support, a shifter rail, a control lever movable in one direction to engage the rail for actuating the same, said lever having an enlarged portion adjacent the lower end thereof and having a reduced portion above the enlarged portion, a member carried by the support and engageable with the enlarged portion to prevent movement of the lever into engagement with the rail, said member having an elongated slot therein terminating in a restricted opening having a width slightly greater than the diameter of the reduced portion but substantially less than the width of the enlarged portion and arranged in alignment with the latter when the lever is in its normal position, and means permitting longitudinal movement of the lever to bring the reduced portion in alignment with the opening and thereby permit the lever to be moved to engage the reduced portion in the slot and at the same time permit the lever to operatively engage the rail.

2. A transmission having in combination, a shifter rail mounted for movement in the direction of the axis thereof, a control lever movable in one direction to engage the rail for actuating the same and having an enlarged portion adjacent the lower end thereof, means fixed against movement in the path of travel of the lower end portions of the lever upon movement of the latter portions toward said rail for engaging the enlarged portion aforesaid to prevent movement of the lever into engagement with the rail, said means including a member having a slot therein extending transversely from one side edge of the member and having a width substantially less than the corresponding dimension of the enlargement but sufficient to receive the portion of the lever adjacent the enlargement upon movement of said lever in the path of travel aforesaid, said transverse slot communicating with another slot in the member elongated in the direction of movement of the rail and of sufficient width to receive the portion of the lever adjacent the enlargement and permit the necessary movement of the lever to actuate the rail, and means providing for relative movement of the member and lever in a direction to disalign the enlargement on the lever with the transverse slot aforesaid.

3. A transmission having in combination, a plurality of shifter rails mounted for axial movement relative to each other, means for selectively shifting the rails including a control lever mounted intermediate the ends thereof for rocking movement and for axial displacement, means arranged below the rockable mounting aforesaid of the lever in the path of travel of the lower end portion of the latter upon movement of the same toward one of the rails for preventing engagement of the lever with the latter rail, said means rendered inoperative to obstruct the aforesaid movement of the lever upon axial displacement of the latter.

In testimony whereof I affix my signature.

SCHUYLER A. JEFFRIES.